June 15, 1937.  E. B. G. LEFEVRE  2,083,609
JOINT FOR METAL LINKS
Filed May 11, 1936
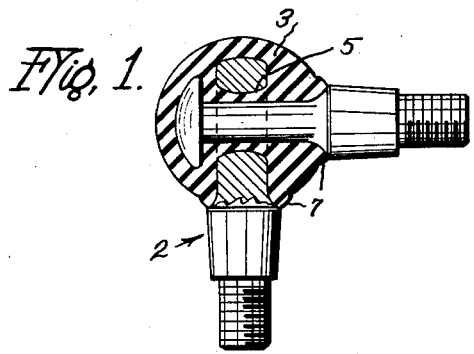
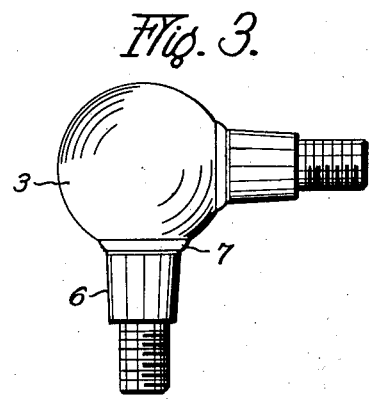
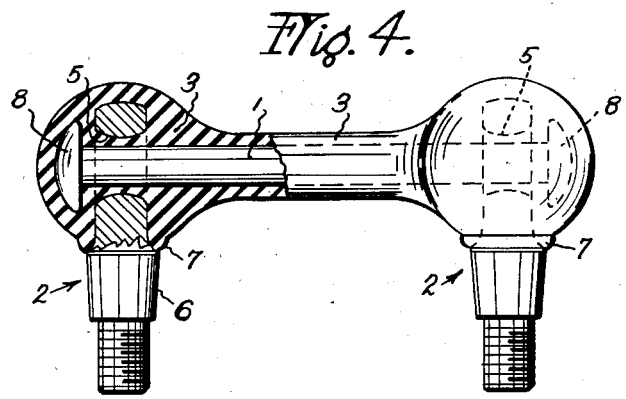
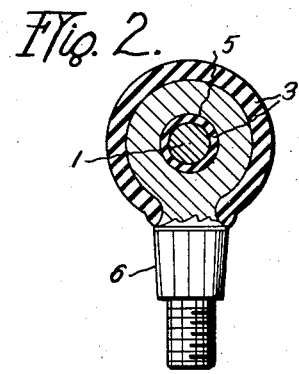
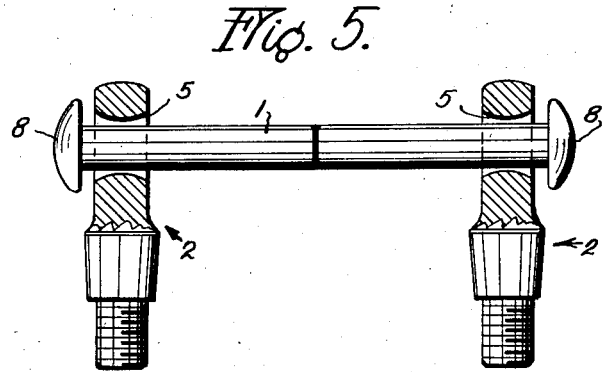
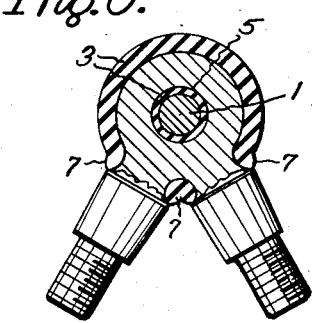
INVENTOR
EMIL B. G. LEFEVRE
BY
Chapin & Neal
ATTORNEYS Patented June 15, 1937

2,083,609

UNITED STATES PATENT OFFICE 2,083,609

JOINT FOR METAL LINKS

Emil B. G. Lefevre, Detroit, Mich.

Application May 11, 1936, Serial No. 79,030

2 Claims. (Cl. 74—579)

This invention relates to an improved joint construction for metal links. It may be used anywhere where joints having the functions of this one are desired. They are desired over a wide range of mechanical constructions. But they are particularly desirable in automobile construction because of the anti-rust function, the simplicity of construction with regard to the number of parts in the joint, the noiseless character of the joint, the character of movement in the joint, and many other advantages which will appear from a full disclosure of the way to practice the invention.

In the drawing,

Fig. 1 is a cross-section through a simple form of the improved joint;

Fig. 2 is a cross-section taken at right angles to the view of Fig. 1;

Fig. 3 is a side view of the finished joint of Fig. 1;

Fig. 4 is a view partly in section of a shock absorber link assembly such as may be used in a specific construction for automobile use;

Fig. 5 is a detail view of the metal parts of Fig. 4 in position for assembly; and Fig. 6 is a cross-section through a joint slightly different from that of Fig. 1.

Referring to Figs. 4 and 5, the link assembly here shown is arranged for use to connect the shock absorber arm of an automobile, to transmit movements through it, between the frame and running gear. This specifically illustrates one practical use of the improved joint, in which most of its advantages will appear.

The finished structure shown comprises in general a shaft 1, passing in spaced relation through the end eyes of studs 2, and covering rubber 3 encasing the assembly. The rubber is molded all around the metal parts, except the mere connecting ends of the studs. Thus, we have a solid structure in which the studs are integrally mounted. The heads of shaft 1 are preferably larger than the eyes in the studs. The latter are arranged parallel, at right angles to shaft 1, and everywhere spaced from the shaft. Solid rubber fills all the spaces and in addition encases all of the shaft 1 and the eye portions of the studs. The rubber gives the finished form of assembly at joints. It is preferred to have the rubber encase the whole shaft 1, as shown, but intermediate parts of the shaft may be exposed if desired for any reason.

The rubber of this assembly is molded and vulcanized on the metal parts. A solid composite structure of rubber and metal is preferred to a structure having any hollow space therein at the joint.

In addition to the broad features of invention in the structure, there is a specific feature which I consider of real importance to the best means of practicing the invention. This specific feature involves the conception of so making the structure that the adherence between the rubber and metal parts will avoid frictional movement between the rubber and metal in their composite mass at the joint. The best way I know of getting adherence for my purpose is to brass-plate the metal parts of steel. Then when the rubber is molded and vulcanized on the brass-plated steel there will be an exceptional adhesion or cling between meeting surfaces of rubber and metal parts. This adhesion has utility in the functional movements desired between the studs and shaft. These movements are within the stretching and compressing limits of the rubber in the solid assembly shown. With enough adhesion between the metal and rubber, all frictional movement between the parts will be avoided. As a consequence all movement between the parts will be resisted solely by the elasticity of the rubber body. There will be no surface friction and it is this ideal condition that I am striving to attain as nearly as possible in the best practice of my joint for metal links, particularly in a joint having the desired characteristics of a ball and socket joint without its disadvantages.

It is an incident, but an important one, in automobile work that my joint when made with the adhesion described is closed against any seeping action of oil, grit, or dirt into the area where the rubber and metal meet. In other words, the joint is made solid without even a crack entrance or interior sliding surfaces for foreign matter to act in the joint.

The solid structure of Figs. 4 and 5 may be compared to the prior art structure for the shock absorber link assembly used on Ford cars today. That prior structure has two ball-shaped metal casings joined to the ends of a connecting shaft. A rubber ball is held in each casing. And each rubber ball contains at its center the ball headed end of a stud, and the stud shank protrudes from its casing. It is a variation of a ball and socket arrangement in which the socket is merely lined with rubber. As compared to this prior art structure my improvement presents a casing of solid rubber, which casing does not need to be painted or refinished, and can stand the knocks and griefs of automobile use in exposed parts, and the rubber casing is a permanent protection against rust, not only of the casing itself, but of the contained metal parts. Furthermore, in my structure when the studs move within the limits of their intended universal movements, they compress part of the rubber and tension part and the whole body of rubber may enter into the action to distribute the load. In normal position the rubber is at rest and under no strain of either tension or compression. This provides for a long use of the rubber before fatigue sets in. This brief comparison with a specific prior art construction does not point out all the utilities in the improved structure, but enough to indicate definite improvement. There are fewer parts and they function better in many respects than the prior art.

With regard to the manufacture of my improvement, Fig. 5 indicates a preferred way of procedure. The headed shaft 1 is first made up in two parts, each part is passed through one of the eyes 5 of the studs, and the small ends of the shaft are then butt welded to make one integral part. The metal assembly of steel is then brass-plated and a very light coat will be sufficient. Then the assembly is placed as a core in a rubber mold, with the metal parts supported in the positions they are to occupy in the finished structure. Unvulcanized rubber is packed in the mold, all around the metal, the mold is closed, heat applied, and pressure maintained on the mold parts so that the rubber will flow in its heated plastic state to completely fill the mold and completely encase all parts of the metal except for the protruding ends 6 of the studs and to vulcanize the rubber. The desired procedure in the molding step will be understood by the rubber molder and no further detail seems necessary for him, when he has the structural form of Fig. 4 and these directions to work from. In that figure it will be noted that I provide an integral rubber bead 7 where the rubber stops and the metal ends 6 of the stud appear in the finished structure. This is just a desirable point to avoid a feather-edge of the rubber which might tear if too thin at this junction, and the beads 7 improve appearance. Of course many variations from the detail I have mentioned will occur to the manufacturer. For example, the shaft 1 instead of being made in two halves may be made of one piece and a head fastened or upset on one end after putting on the stud parts. The shaft heads 8 are preferably of the form as shown and are slightly larger than the eyes 5 of the studs. Instead of welding two shaft halves together as described they may have their small ends provided one with an integral threaded socket and one with a threaded reduced end, or the ends may be threaded and joined by a threaded sleeve.

In Figs. 1, 2, and 3 I have indicated my invention in a joint structure of a type that may be used anywhere that a ball and socket joint of limited universal movement may be used, and with many advantages. The protruding ends of the studs of course will vary in form according to use to which the joint is put.

In Fig. 6 I have indicated a joint with three link connections such as might be used in automobile link joints. Such constructions are particularly useful for the shock absorber link connections, the steering rod connections, radius rod connections, and in very many other connections where the function of slight universal movement is desired such as commonly given by a ball and socket joint or other forms of universal joints. In my improved construction in the forms shown the oscillating movement for the universal joint is about an imaginary point at the center of the stud eye 5. The movement will be approximately about such a point Having disclosed my invention and the means to practice it I desire to claim the invention both broadly and specifically, without limitation except as the prior art may require.

I claim:

1. An automobile shock absorber link construction for connecting the shock absorber arm to the running gear which comprises a metal link, metal studs loosely coupled to the opposite ends of said link and a solid body of vulcanized rubber surrounding said link and the coupled portions of the studs, the same being embedded and completely enclosed in said solid body of vulcanized rubber, the coupled portions being bound together and held spaced from each other by the surrounding rubber, the entire outer surface of the rubber mass being substantially unconfined and free from external restraint, the longitudinal axes of the studs intersecting the longitudinal axis of the link.

2. An automobile shock absorber link construction for connecting the shock absorber arm to the running gear which comprises a metal link, metal studs loosely coupled to the opposite ends of said link by headed pin and eye connections and solid spherical bodies of vulcanized rubber surrounding the coupled portions of the studs and link, the same being embedded and completely enclosed in said solid spherical bodies of vulcanized rubber, the said coupled portions being bound together and held spaced from each other by the surrounding rubber, the longitudinal axes of the studs intersecting the longitudinal axis of the link substantially at the centers of their respective rubber spheres, said spheres being integrally connected together to form a sheath completely enclosing, and bonded to, the link.

EMIL B. G. LEFEVRE.